US00RE40358E

(19) United States
(12) Reissued Patent
Thompson et al.

(10) Patent Number: US RE40,358 E
(45) Date of Reissued Patent: Jun. 3, 2008

(54) OUTSIDE PLANT FIBER DISTRIBUTION APPARATUS AND METHOD

(75) Inventors: Patrick Thompson, Roseville, MN (US); Brian L. Johnson, Maple Grove, MN (US); Anthony L. Tischler, Hastings, MN (US)

(73) Assignee: ADC Telecommunications, Inc., Minnetonka, MN (US)

(21) Appl. No.: 10/810,547

(22) Filed: Mar. 26, 2004

(Under 37 CFR 1.47)

Related U.S. Patent Documents

Reissue of:
(64) Patent No.: 6,363,200
Issued: Mar. 26, 2002
Appl. No.: 09/689,989
Filed: Oct. 13, 2000

U.S. Applications:
(62) Division of application No. 09/122,947, filed on Jul. 27, 1998, now Pat. No. 6,160,946.

(51) Int. Cl.
*G02B 6/00* (2006.01)
*H05K 7/00* (2006.01)

(52) U.S. Cl. ..... 385/135; 385/136; 361/728; 174/50

(58) Field of Classification Search ..... 385/134–139
See application file for complete search history.

(56) References Cited

U.S. PATENT DOCUMENTS 4,652,072 A * 3/1987 Arasi, Jr. ..... 439/470
4,717,231 A 1/1988 Dewez et al.
4,805,979 A 2/1989 Bossard et al.
4,986,762 A 1/1991 Keith (Continued)

FOREIGN PATENT DOCUMENTS

EP 0 511 147 A1 10/1992
EP 0 805 536 A1 11/1997
EP 0 844 504 A2 5/1998
EP 0 851 257 A1 7/1998

(Continued)

OTHER PUBLICATIONS

ADC Telecommunications; FL2000 Products; 6 pages; Nov. 1996.
ADC Telecommunications; Fiber Panel Products Second Edition; 16 pages; Jul. 1996.
ADC Telecommunications; Fiber Cable Management Products Third Edition; 22 pages; Jun. 1998.
ADC Telecommunications; Value–Added Module System; 8 pages; Jun. 1998.

(Continued)

*Primary Examiner*—Michelle R. Connelly-Cushwa
(74) *Attorney, Agent, or Firm*—Merchant & Gould P.C.

(57) ABSTRACT

An outside plant fiber distribution apparatus includes a frame member and a plurality of fiber optic modules mounted to the frame member. The frame member includes upper and lower module mounting brackets. Each module includes a front and two mounting flanges, each mountable to one of the upper and lower module mounting brackets. At least one of the modules is configured as a connection module including a plurality of connection locations disposed along the front of the module. A rear of the module includes a cable notch region for receipt of a cable. At least one of the modules defines a storage module including first and second spools. In an interconnect system, the storage module includes a cable clamp for holding a second cable, the cables are connected through the connection locations of the connection module. In a cross-connect system, two connection modules are provided, and patch cords are used to connect the fronts of the connection modules. The modules may also house splices, and/or optical couplers, such as splitters and wave division multiplexers.

38 Claims, 21 Drawing Sheets

U.S. PATENT DOCUMENTS

| | | | | |
|---|---|---|---|---|
| 5,029,958 | A | | 7/1991 | Hodge et al. |
| 5,046,811 | A | | 9/1991 | Jung et al. |
| 5,097,529 | A | | 3/1992 | Cobb et al. |
| 5,122,069 | A | | 6/1992 | Brownlie et al. |
| 5,129,030 | A | | 7/1992 | Petrunia |
| 5,133,038 | A | | 7/1992 | Zipper |
| 5,212,761 | A | * | 5/1993 | Petrunia ..... 385/135 |
| 5,214,735 | A | | 5/1993 | Henneberger et al. |
| 5,231,687 | A | | 7/1993 | Handley |
| 5,235,665 | A | | 8/1993 | Marchesi et al. |
| 5,267,122 | A | | 11/1993 | Glover et al. |
| 5,363,465 | A | | 11/1994 | Korkowski et al. |
| 5,367,598 | A | | 11/1994 | Devenish, III et al. |
| RE34,955 | E | | 5/1995 | Anton et al. |
| 5,446,823 | A | | 8/1995 | Bingham et al. |
| 5,509,099 | A | | 4/1996 | Hermsen et al. |
| 5,633,973 | A | | 5/1997 | Vincent et al. |
| 5,659,650 | A | | 8/1997 | Arnett |
| 5,689,607 | A | | 11/1997 | Vincent et al. |
| 5,701,380 | A | | 12/1997 | Larson et al. |
| 5,732,180 | A | | 3/1998 | Kaplan |
| 5,734,776 | A | | 3/1998 | Puetz |
| 5,745,633 | A | | 4/1998 | Giebel et al. |
| 5,758,003 | A | | 5/1998 | Wheeler et al. |
| 5,781,678 | A | | 7/1998 | Sano et al. |
| 5,828,807 | A | | 10/1998 | Tucker et al. |
| 5,892,870 | A | | 4/1999 | Fingler et al. |
| 5,894,540 | A | | 4/1999 | Drewing |
| 5,903,698 | A | | 5/1999 | Poremba et al. |
| 5,907,653 | A | | 5/1999 | Burek et al. |
| 5,917,648 | A | | 6/1999 | Harker |
| 5,975,769 | A | * | 11/1999 | Larson et al. ..... 385/53 |
| RE36,592 | E | | 2/2000 | Giebel et al. |
| 6,167,183 | A | | 12/2000 | Swain |
| 6,208,796 | B1 | | 3/2001 | Williams Vigliaturo |
| 6,215,939 | B1 | | 4/2001 | Cloud |
| 6,259,024 | B1 | | 7/2001 | Daoud |
| 6,292,614 | B1 | | 9/2001 | Smith et al. |
| 6,300,562 | B1 | | 10/2001 | Daoud |
| 6,439,779 | B1 | | 8/2002 | Hafer |
| 6,453,106 | B1 | | 9/2002 | Glaser et al. |
| 6,535,682 | B1 | | 3/2003 | Puetz et al. |
| 6,621,975 | B2 | | 9/2003 | Laporte et al. |
| 6,760,531 | B1 | | 7/2004 | Solheid et al. |
| 6,766,094 | B2 | | 7/2004 | Smith et al. |
| 6,880,986 | B2 | | 4/2005 | Mynatt et al. |
| 6,926,449 | B1 | | 8/2005 | Keenum et al. |
| 7,120,347 | B2 | | 10/2006 | Blackwell, Jr. et al. |
| 2003/0077041 | A1 | | 4/2003 | Belaidi et al. |
| 2003/0103750 | A1 | | 6/2003 | Laporte et al. |
| 2004/0062508 | A1 | | 4/2004 | Blankenship et al. |
| 2004/0211774 | A1 | | 10/2004 | Daoud et al. |
| 2005/0094959 | A1 | | 5/2005 | Sibley et al. |
| 2005/0129375 | A1 | | 6/2005 | Elkins, II et al. |
| 2005/0145522 | A1 | * | 7/2005 | Bloodworth et al. |
| 2005/0163448 | A1 | | 7/2005 | Blackwell, Jr. et al. |
| 2005/0175307 | A1 | | 8/2005 | Battey et al. |
| 2005/0175308 | A1 | | 8/2005 | Elkins, II et al. |
| 2005/0185895 | A1 | | 8/2005 | Keenum et al. |
| 2005/0213921 | A1 | | 9/2005 | Mertesdorf et al. |
| 2005/0220421 | A1 | | 10/2005 | Keenum et al. |

FOREIGN PATENT DOCUMENTS

| | | |
|---|---|---|
| FR | 2 853 775 | 2/2004 |
| JP | 9-15426 | 1/1997 |
| WO | WO 95/07478 | 3/1995 |
| WO | WO 02/06879 A1 | 1/2002 |

OTHER PUBLICATIONS

ADC Telecommunications; FL2000™ Wall Mount Box Installation Instructions; 18 pages; ADCP–90–210 Issue 4; Jan. 1998.

ADC Telecommunications; FTUA 4–and 12–Fiber Wall Box User Manual; 14 pages; ADCP–90–249 Issue 2, Mar. 1997.

ADC Telecommunications; Wall Mount Box 12/24/36 Fiber User Manual; 16 pages; ADCP–90–149 Issue 3, Jul. 1997.

ADC Telecommunications; FL1000 Wall–Mount Box Installation and Operation Guide; 28 pages; ADCP–90–334 Issue 1, Nov. 2004.

ADC Telecommunications; FTD1 36–Fiber Wall Box User Manual; 15 pages; ADCP–90–250 Issue 1, Nov. 1996.

ADC Telecommunications; Six–Fiber In–Building Wall Box Installation Instructions; 8 pages; ADCP–90–167 Issue 3, Nov. 1997.

* cited by examiner

OUTSIDE PLANT FIBER DISTRIBUTION APPARATUS AND METHOD

Matter enclosed in heavy brackets [ ] appears in the original patent but forms no part of this reissue specification; matter printed in italics indicates the additions made by reissue.

*CROSS-REFERENCE TO RELATED APPLICATIONS*

*Notice: More than one reissue application has been filed for the reissue of Pat. No. 6,363,200. The reissue applications are application Nos. 10/810,547 (the present application) and 11/397,885 (a divisional reissue application of U.S. Pat. No. 6,363,200).*

This application is a divisional of application Ser. No. 09/122,947, filed Jul. 27, 1998, now U.S. Pat. No. 6,160,946 which application is incorporated herein by reference.

FIELD OF THE INVENTION

This invention relates to an apparatus for housing fiber optic telecommunications equipment in outside plant environments. More particularly, this invention relates to an enclosure and management apparatus for housing cross-connect and/or interconnect equipment for fiber optic telecommunications systems. This invention also relates to modules for housing optical couplers such as optical splitters, wavelength division multiplexers.

BACKGROUND OF THE INVENTION

With the increased use of fiber optic technology in telecommunications, there is a need for apparatus which permit access to cross-connect functions and interconnect functions, while protecting the components in the field. For example, it is desirable to have access to fiber optic cables in outdoor locations such as contained within an enclosure adjacent to buildings which are linked at the enclosure to a feeder line.

In order to protect fiber optic connections from the environment and from damage due to impact or vandalism, such equipment is housed in enclosures which may be securably locked from unauthorized access. An example enclosure is shown in U.S. Pat. No. 5,734,776. The enclosure has a circular base, and a cylindrical shape. Enclosures with a more square shape are also known. Reltec (Reliable Electric) of Cleveland, Ohio sells a generally square enclosure, or pedestal, typically made of green colored metal, identified as CAD 12. The Reltec CAD12 enclosure is generally about 12 inches by 12 inches at the base and about three to four feet high.

Providing cross-connect and/or interconnect functions within the enclosure is desired. Ease of assembly of the system and ease of access for later maintenance of the system are also desired. There is a need for further apparatus and methods for enclosing and managing outside plant equipment with cross-connect and interconnect functions. There is also a need for enclosing and managing fiber optic splice locations and optical couplers.

SUMMARY OF THE INVENTION

An optical fiber distribution frame apparatus includes a frame member having upper and lower module mounting brackets and an interior. The upper and lower module mounting brackets are spaced apart to define a space for receipt of a plurality of fiber optic modules mounted to the frame member. Each module includes a front and two mounting flanges. Each mounting flange is mountable to one of the upper and lower module mounting brackets.

The modules are provided with one or more functions. One of the modules defines a connection module and further includes a rear spaced from the front, a spaced apart top and bottom positioned adjacent to the flanges, and spaced apart sides. The connection module is configured and arranged for housing a plurality of connection locations having exposed openings along the front arranged in one or more vertical arrays. The bottom, the rear, and the opposed sides of the connection module define a cable notch region, wherein the cable notch region includes an opening for a first cable to enter the module. The first cable is connectable to the connection locations within an interior of the connection module either directly or through optical couplers. A further module defines a storage module including first and second spools positioned on the front.

The connection locations preferably define adapters for connection to connectors of fiber optic cables. Preferably, the adapters are angled downwardly when the connection module is mounted to the frame member.

An enclosure is preferably provided to surround the frame member for use in an outside plant application. In the case of configuring the optical fiber distribution frame apparatus as an interconnect system, the storage module preferably includes a cable clamp positioned on the front for clamping a second cable, wherein the second cable is connectable to the connection locations on the connector module. The frame member preferably has a cable tray and an opening sized for receipt of the second cable. The interconnect system may also include a blank or filler module defining a generally planar front.

In the case of configuring the optical fiber distribution frame apparatus as a cross-connect system, two connection modules are provided, and the storage module is positioned between the two connection modules. One or more patch cords link the connection locations of the two connection modules.

The present invention also relates to a method of assembling an optical fiber distribution frame including the steps of providing a frame member, and selecting a plurality of fiber optic modules for mounting to the frame. The fiber optic modules are selected so as to fill the frame member with desired functions. Connection modules, storage modules, and blank or filler modules can be selected as desired. In the case of a cross-connect system, two connection modules are mounted to the frame member, with a storage module positioned between the two connection modules and mounted to the frame member in one embodiment. In the case of an interconnection system, a connection module is mounted to the frame member, as well as a storage module in another embodiment.

The present invention also relates to individual components comprising an optical fiber distribution frame apparatus. A frame member defines an interior, and includes an open front bounded by upper and lower module mounting brackets. The lower module mounting brackets further include a plurality of openings configured and arranged for receiving cable.

A connection module in accordance with the present invention includes a front and two mounting flanges. A rear of the module is spaced from the front. A top and bottom are positioned adjacent to the flanges, and opposed spaced apart sides define an enclosed interior for the connection module. The connection module interior houses a plurality of connection locations having exposed openings along the front. The bottom, the rear, and the opposed sides define a cable notch region wherein the cable notch region defines an opening for receiving a first cable.

A storage module in accordance with the present invention includes a front and two mounting flanges, and first and second spools in alignment extending between the two mounting flanges. Side edges of the front further include projecting cable guides. In the case of a storage module for use in an interconnect system, a cable clamp is also positioned on the front for clamping a cable.

Blank or filler modules are also provided in accordance with the invention to fill unused space of the frame member. Each blank module includes a generally planar front, and two mounting flanges. Side flanges extend in an opposite direction to the direction faced by the front.

The connection module may house within its interior a splice between the first cable entering the module through the cable notch region, and the individual cables leading to the connection locations on the front of the module or to one or more optical couplers housed within the interior of the module. Example couplers include optical splitters and wavelength division multiplexers.

DETAILED DESCRIPTION OF THE PREFERRED EMBODIMENTS

Figure 1:
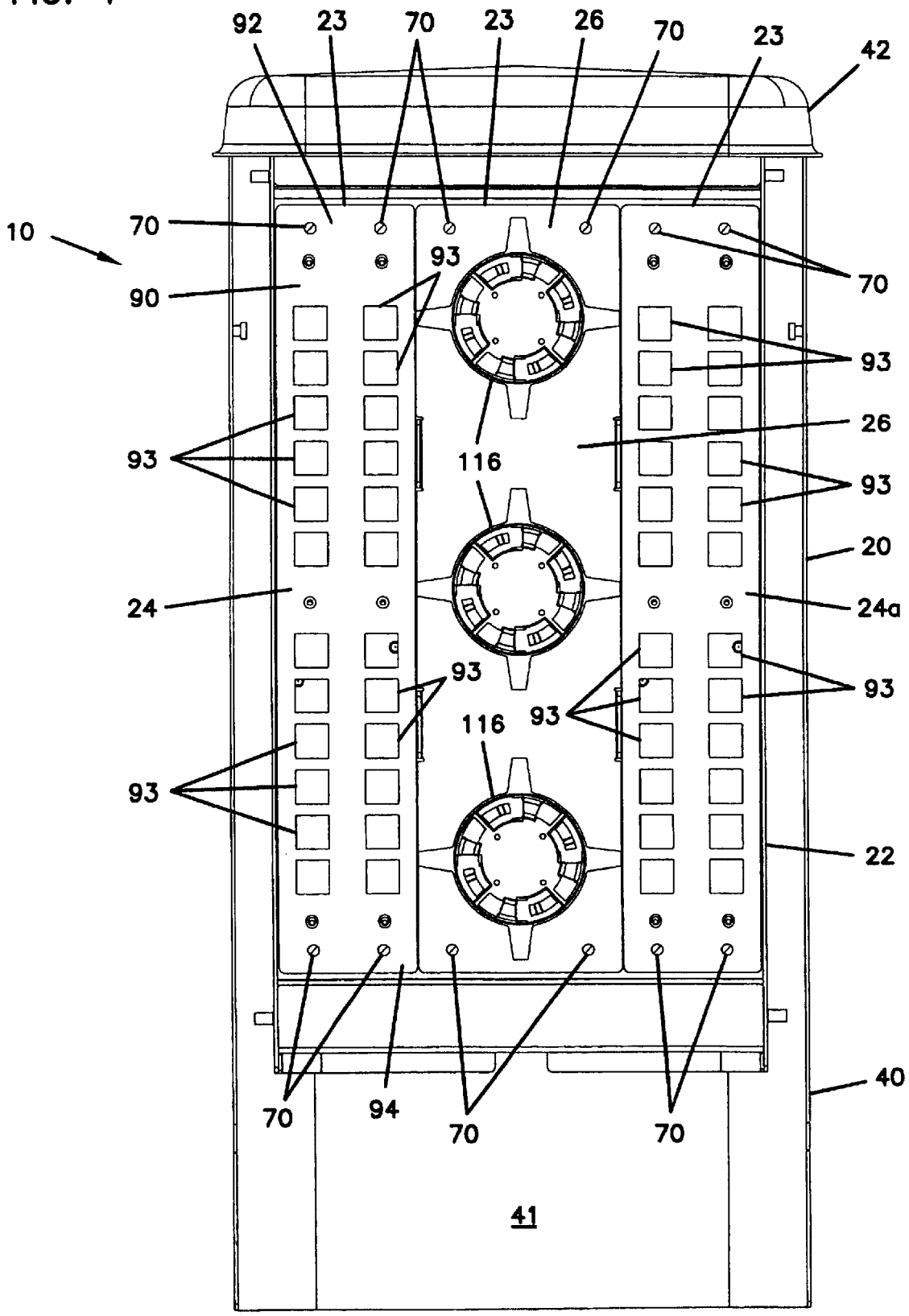
FIG. 1 is a front view of a fiber distribution apparatus in a cross-connect configuration, with portions of the enclosure and the cover removed.
Figure 2:
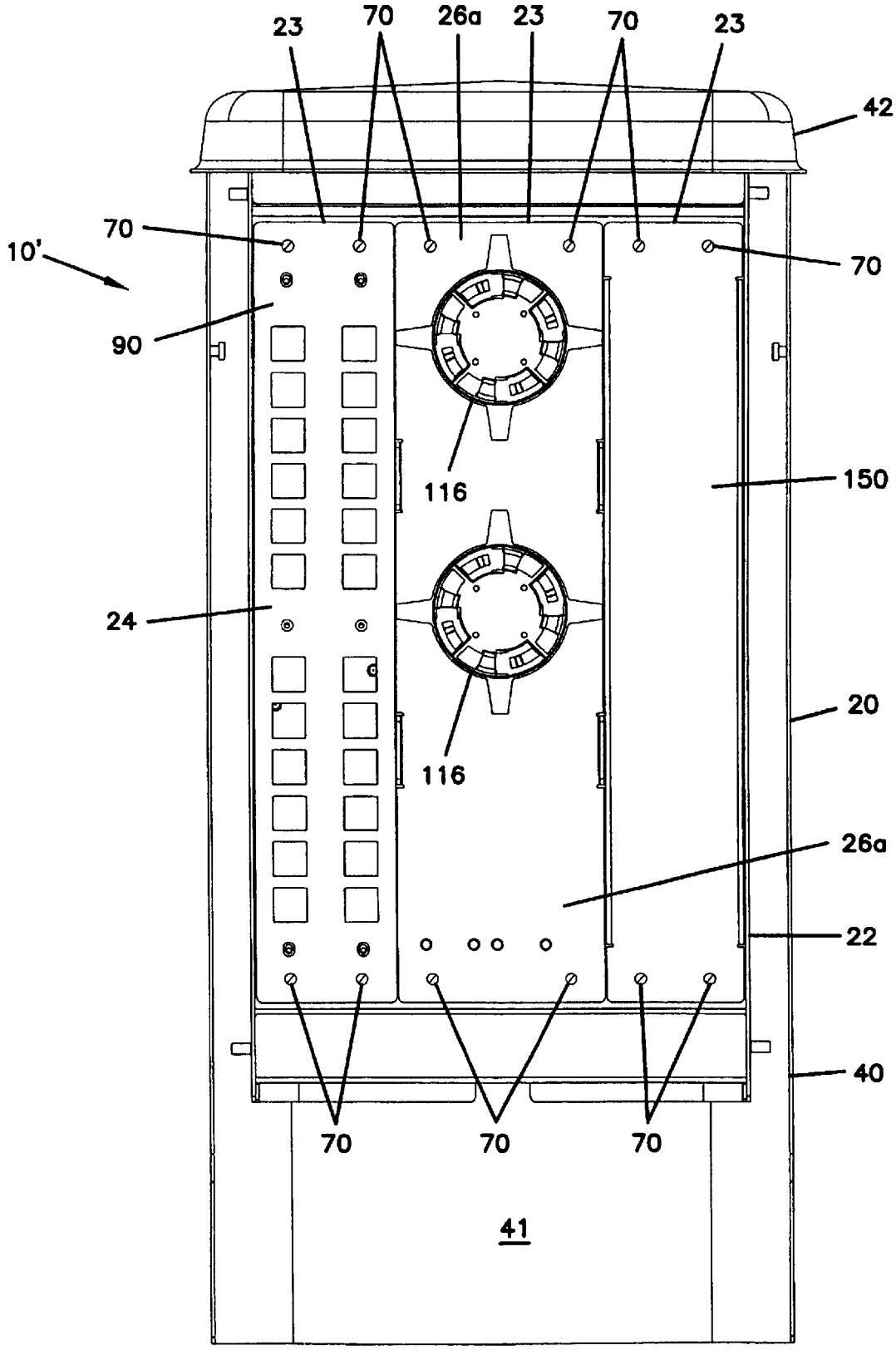
FIG. 2 is a front view of a fiber distribution apparatus in an interconnect configuration, With portions of the enclosure and the cover removed.
Figure 3:
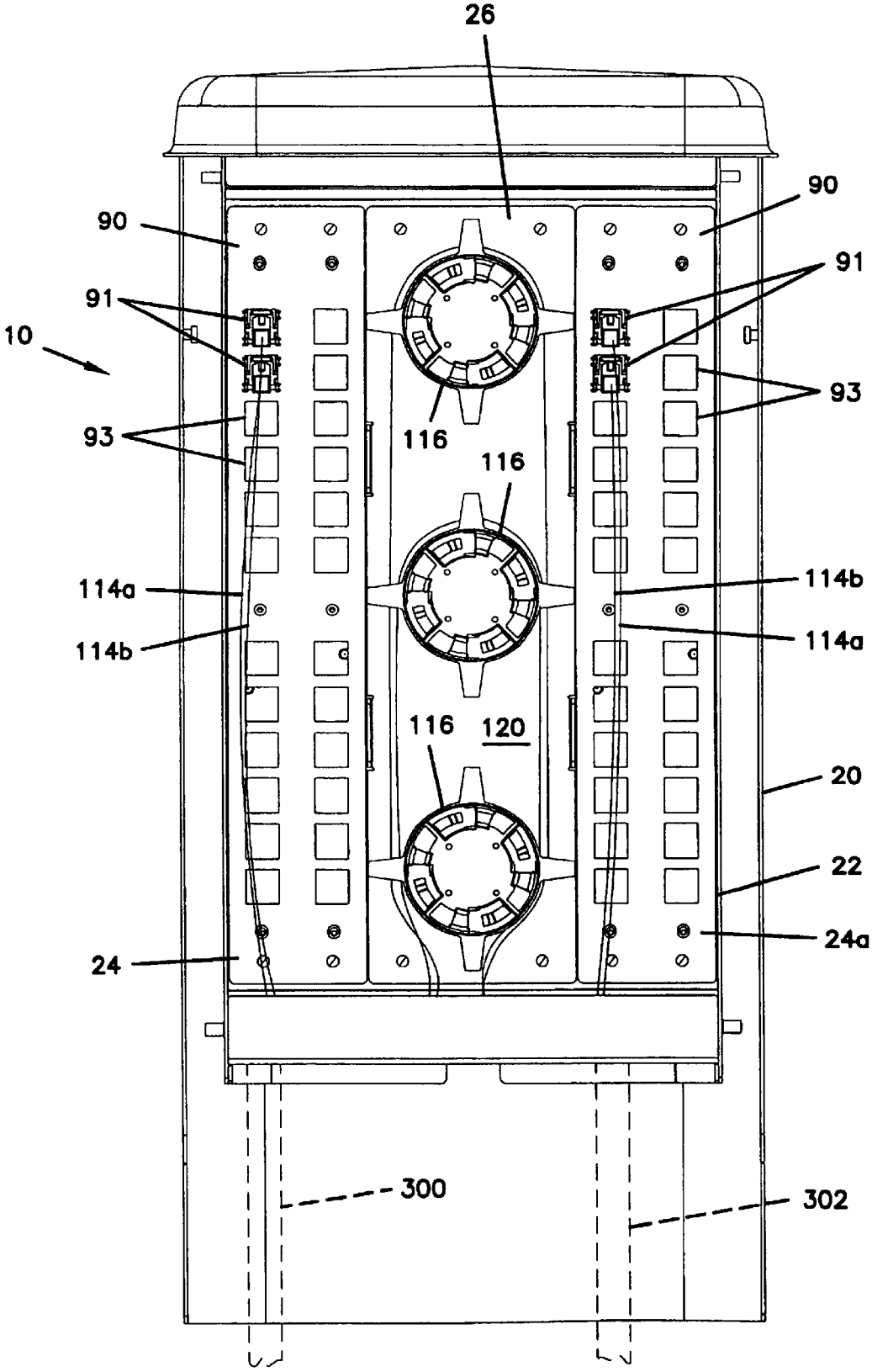
FIG. 3 shows the cross-connect fiber distribution apparatus of FIG. 1 including exemplary fibers in place.
Figure 4:
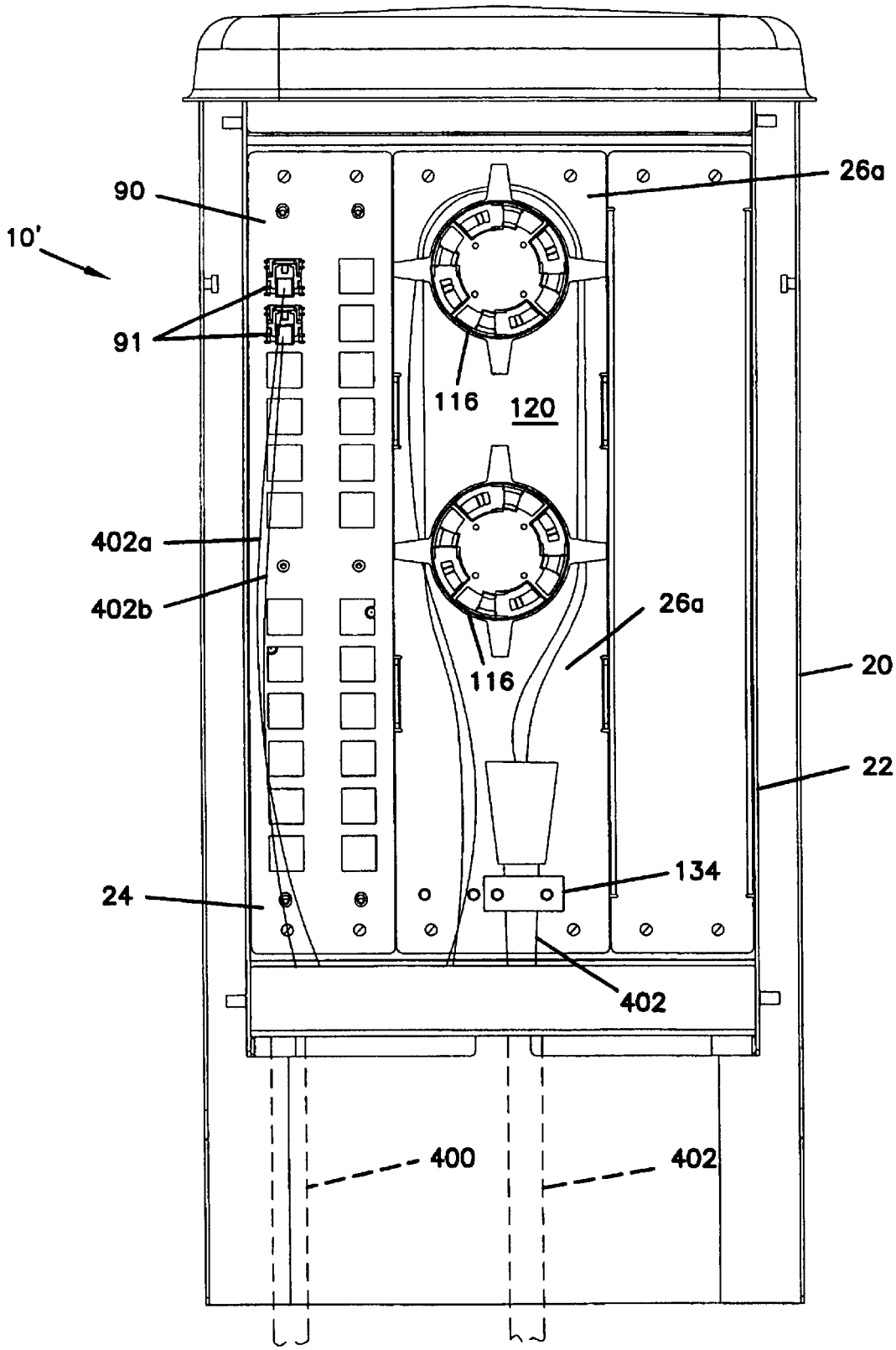
FIG. 4 shows the interconnect fiber distribution apparatus of FIG. 1 including exemplary fibers in place.
Figure 5:
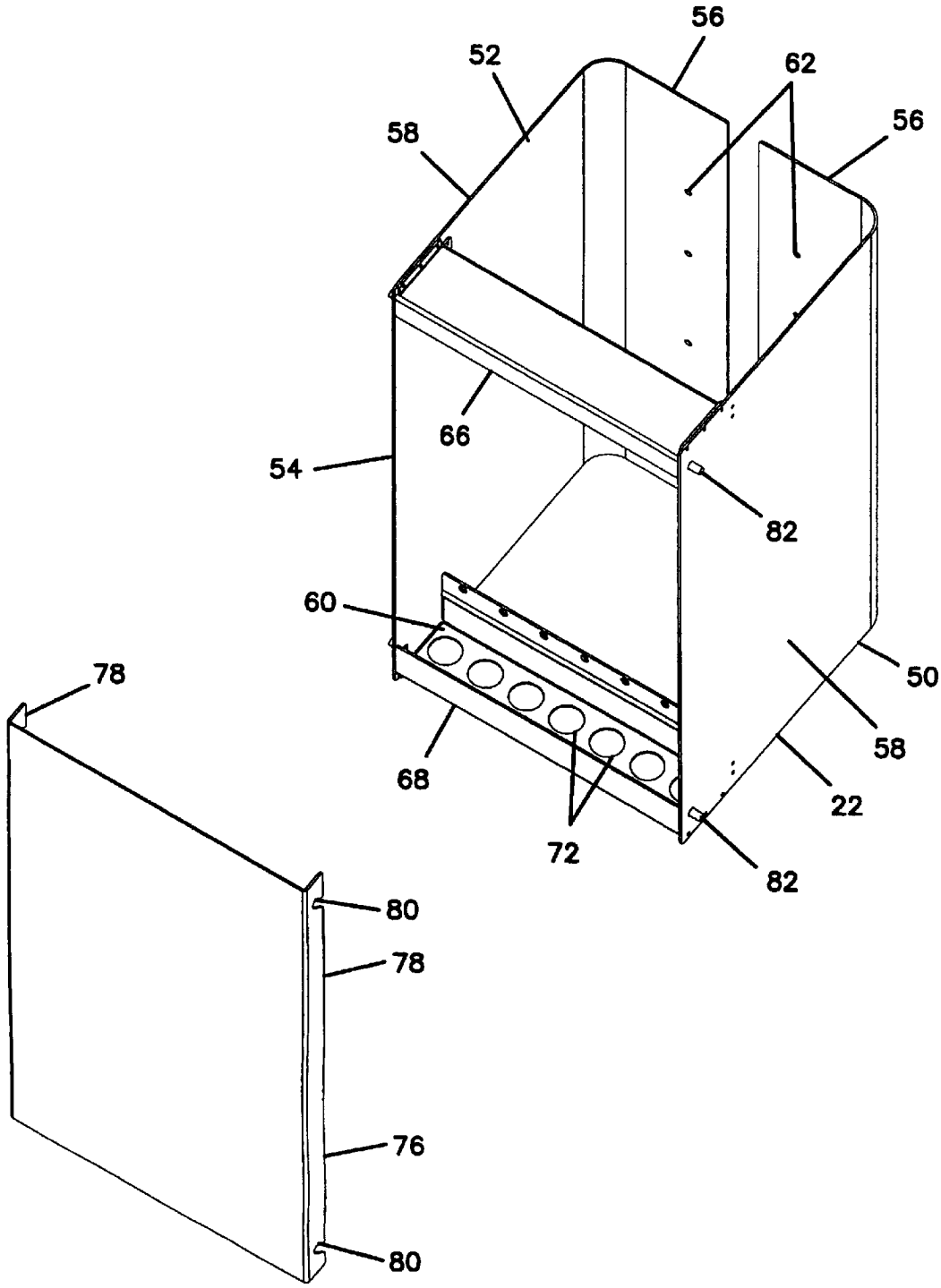
FIG. 5 is an exploded perspective view of the frame and the cover.
Figure 6:
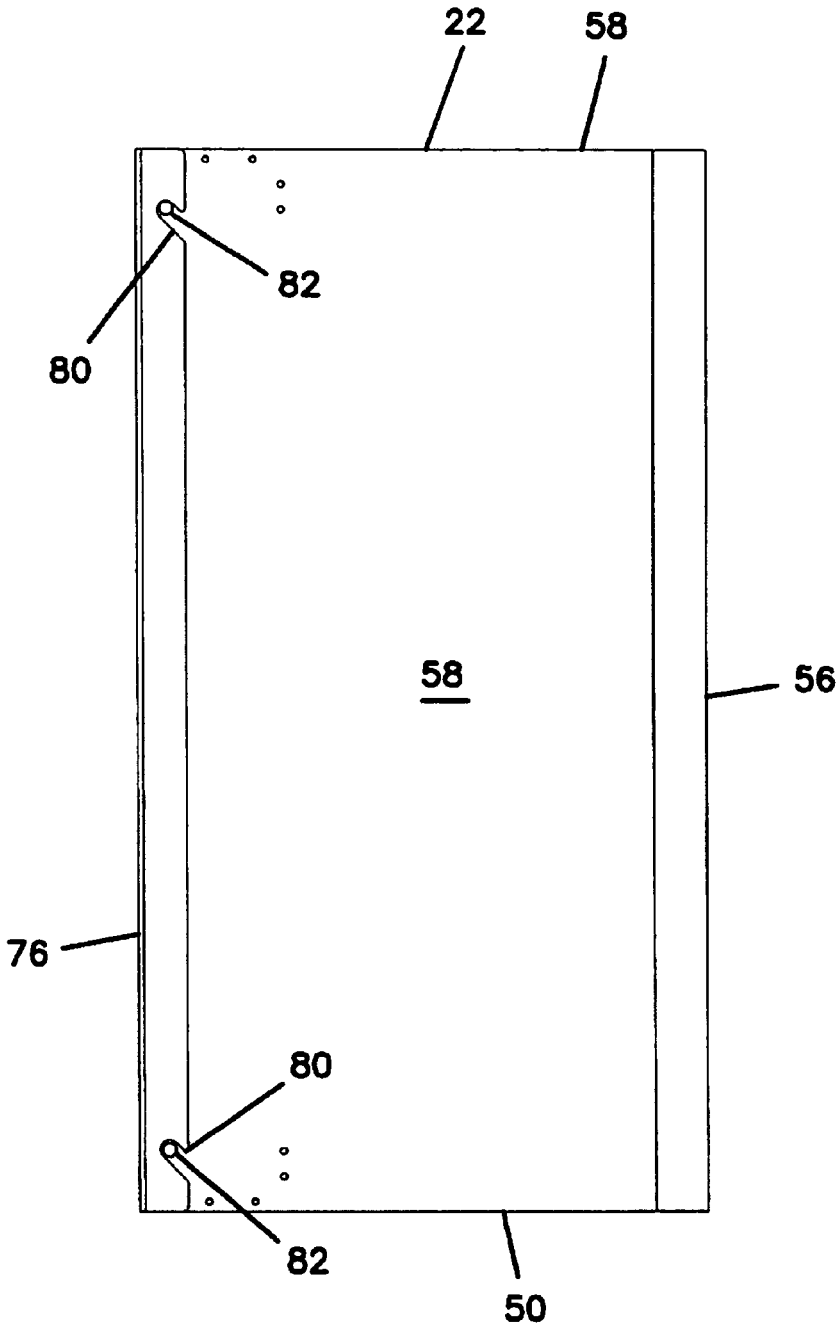
FIG. 6 is a side view showing the cover mounted to the frame.
Figure 7:
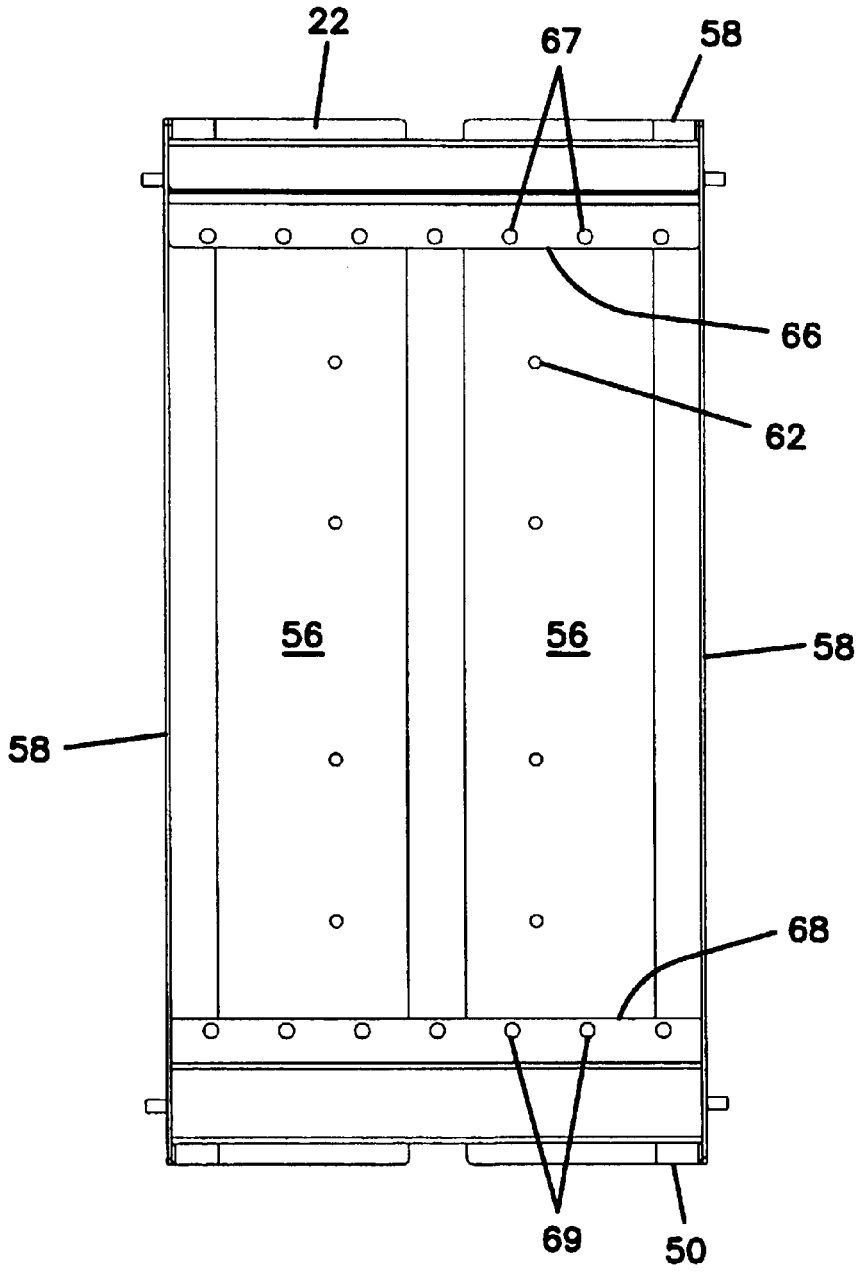
FIG. 7 is a front view of the frame.
Figure 8:
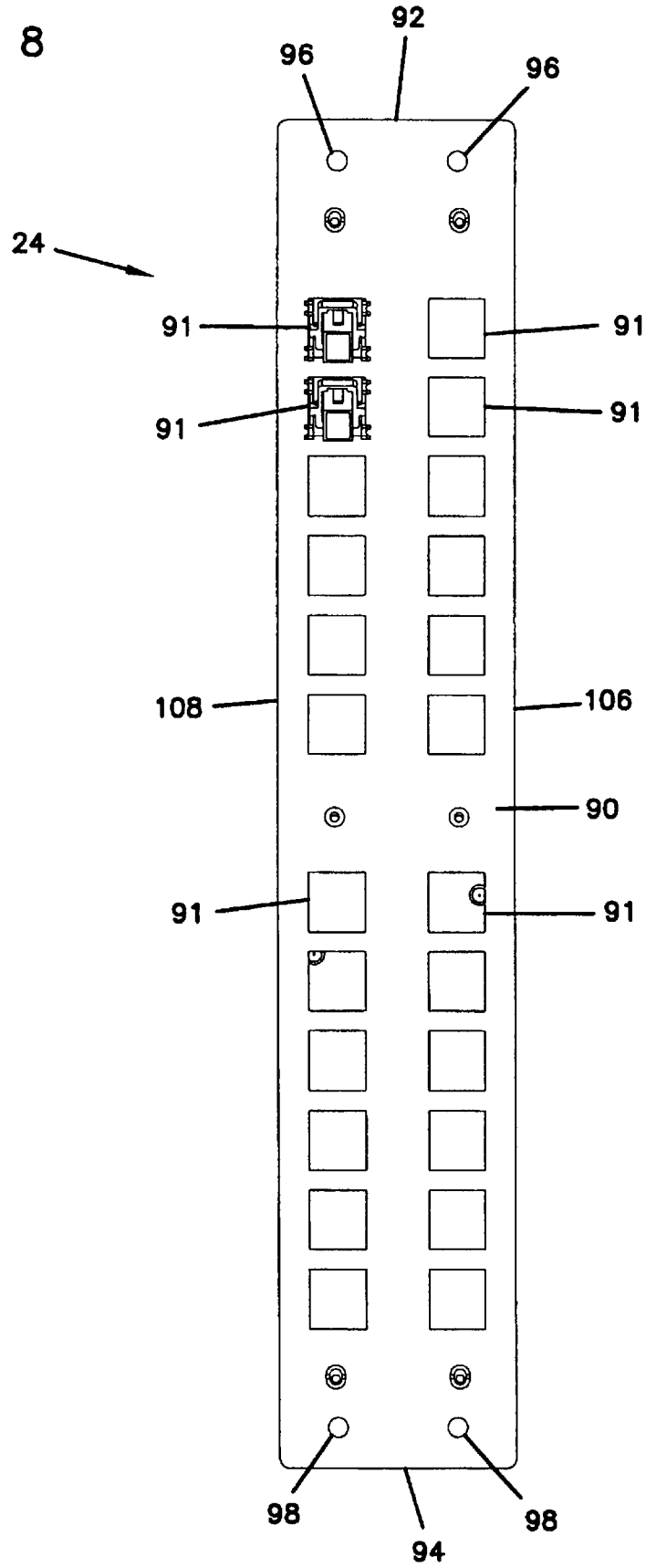
FIG. 8 is a front view of a connection module, showing two exposed adapters for connecting to two connectors.
Figure 9:
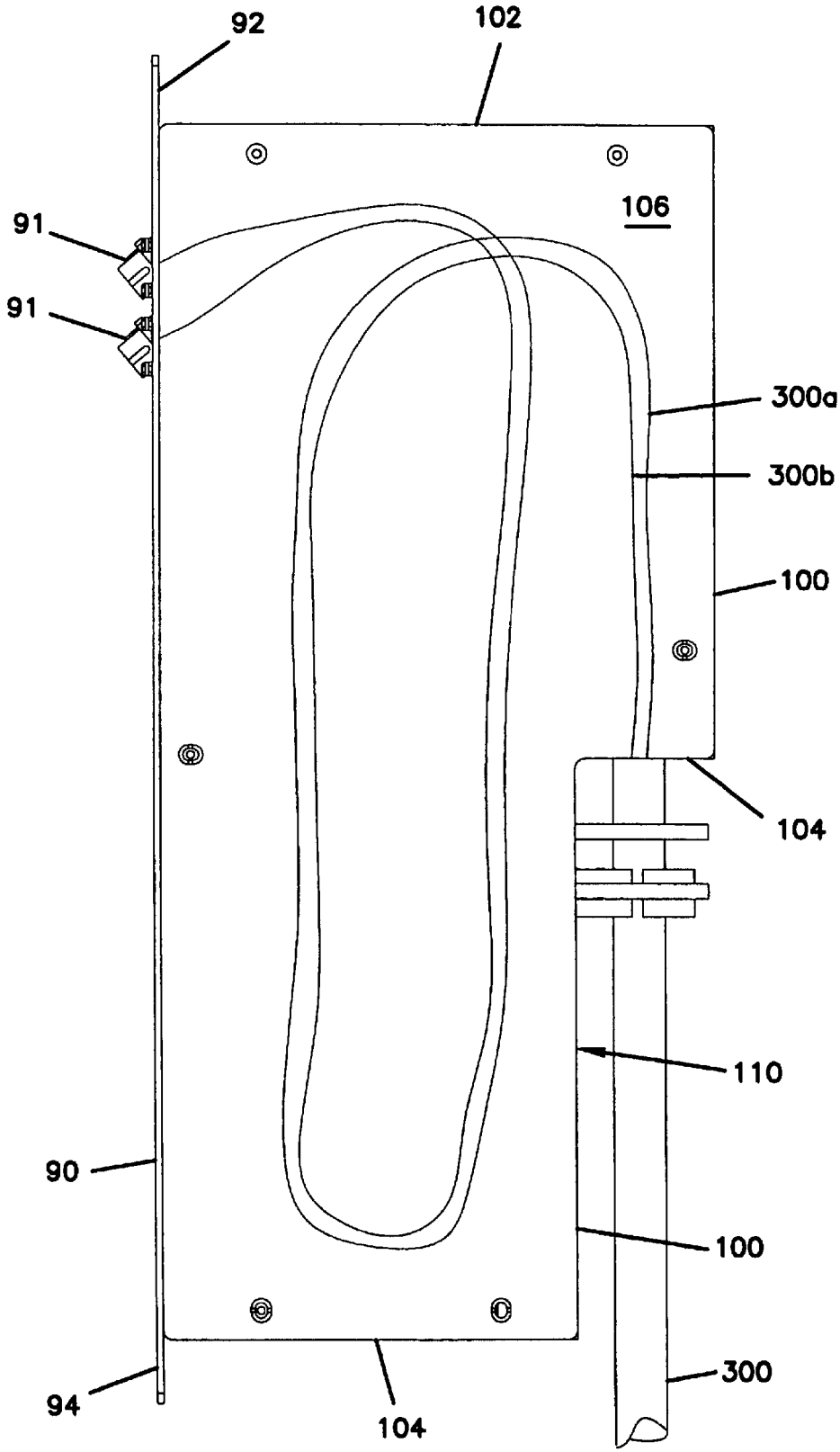
FIG. 9. is a side view of the connection module of FIG. 8, showing a first cable mounted to the rear in the cable notch and held by a cable clamp. Example individual fibers within the module are also shown schematically.
Figure 10:
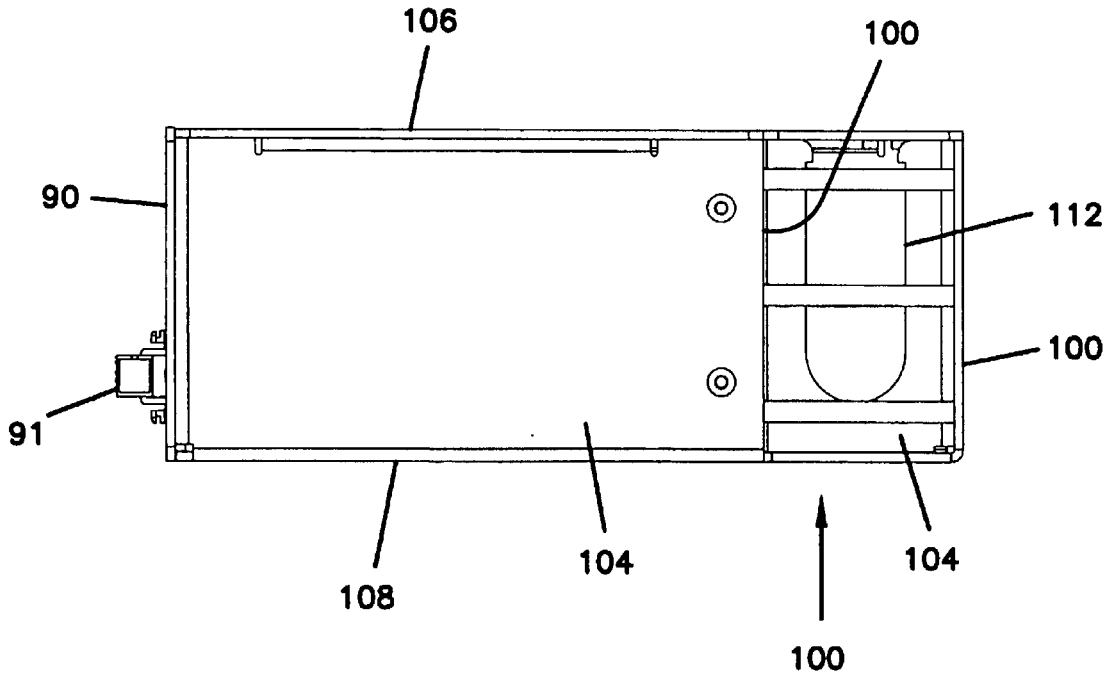
FIG. 10 shows the bottom of connection module in greater detail.
Figure 11:
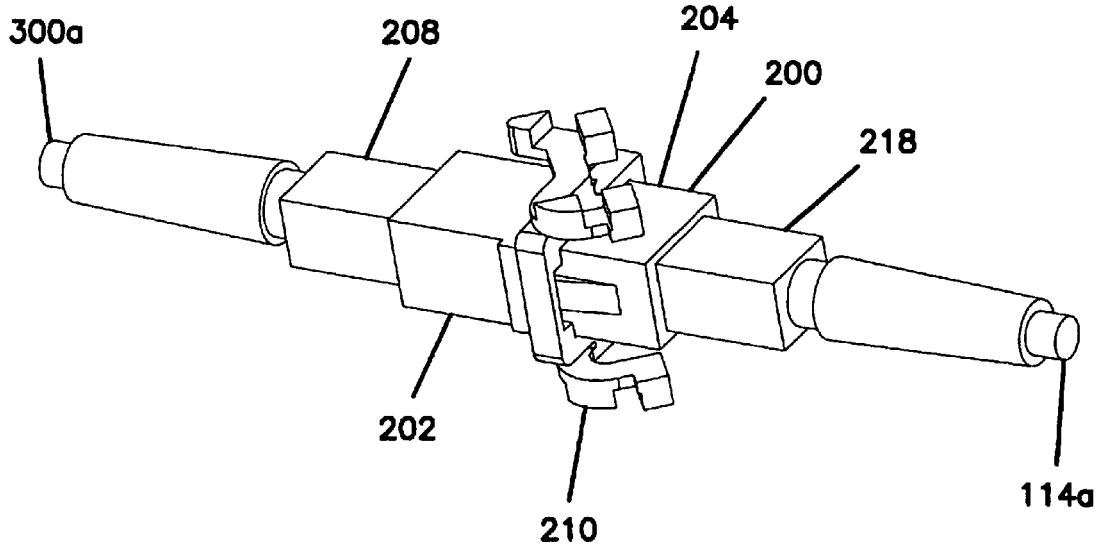
FIG. 11 is a perspective view of one of the front adapters held by a clip and connected to two connectors.
Figure 12:
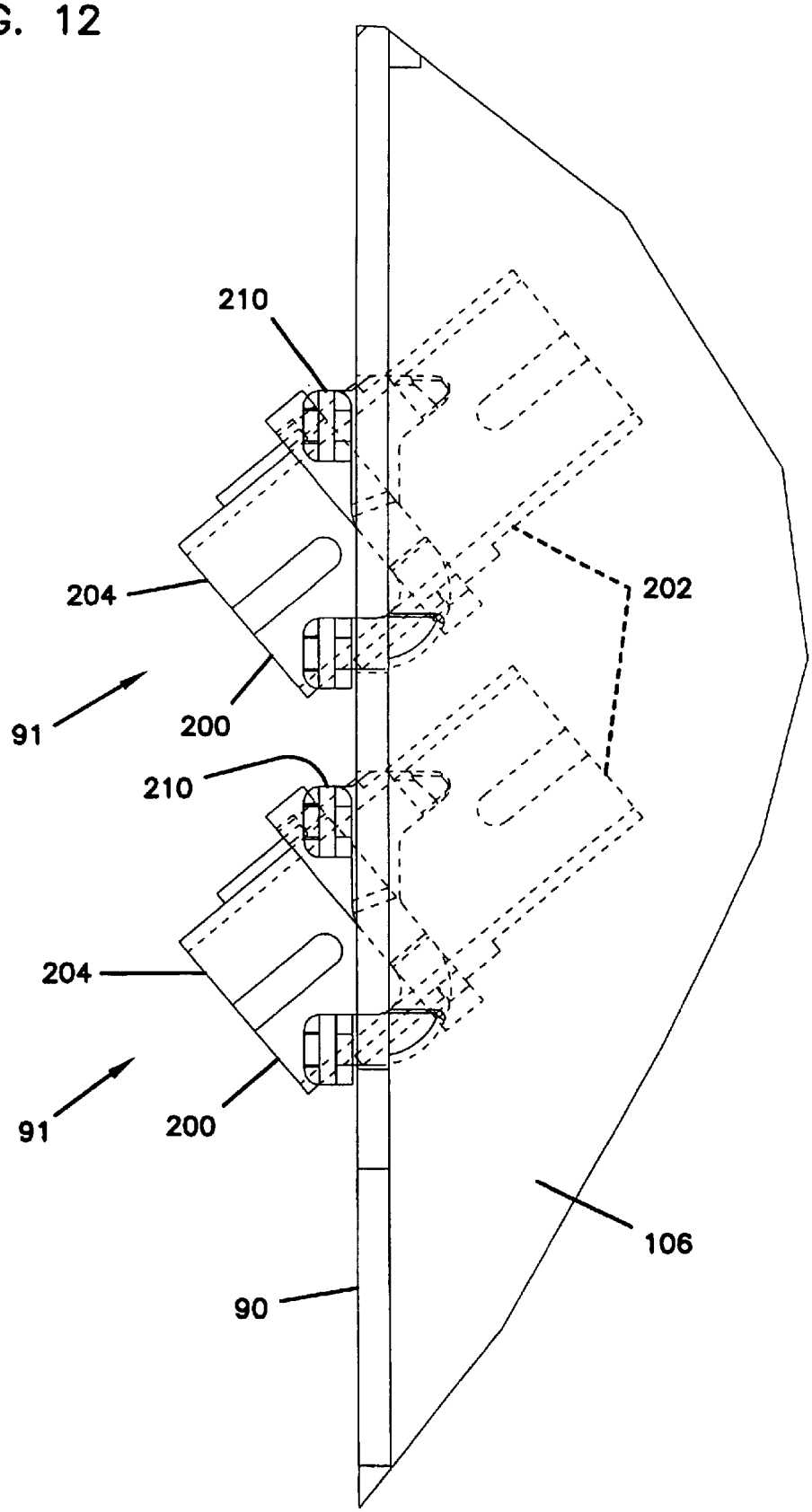
FIG. 12 shows in greater detail a portion of the front of the connection module with the adapters and clips.

Referring now to FIGS. 1 and 3, a fiber distribution apparatus 10 is shown for use in cross-connect applications. FIGS. 2 and 4 show a similar fiber distribution apparatus 10' configured for interconnect applications. Both apparatus 10, 10' include an outer enclosure 20, and an inner frame 22 including a plurality of optical modules 23 mounted thereto. As will be described below in greater detail, modules 23 have particular functions, and apparatus 10, 10' is preferably provided with different modules 23 selected to have the desired functions for the particular application.

Enclosure 20 typically extends from the ground over underground cables 300, 302 (FIG. 3) and 400, 402 (FIG. 4) which extend upwardly from the ground and contain multiple individual optical fibers or bundles of fibers. Cables 300, 302, 400, 402 may be single cables or multiple cables. Enclosure 20 protects the inner components, in this case fiber optic telecommunications equipment. Enclosure 20 can be any convenient structure sized to protect frame 22 and modules 23. In the drawings, enclosure 20 includes a main vertical portion 40 extending from the ground and a top cap 42. Typically, a movable front door is provided, and a lock provides secure access.

Referring now to FIGS. 1–7, frame 22 is secured to main portion 40 of enclosure 20 along a rear side 41 of main portion 40. Frame 22 includes a base or bottom 50, and an opposed top 52. Frame 22 further includes a front 54, and an opposed rear 56, and spaced apart sides 58. Rear 56 of frame 22 can be screwed, riveted, or otherwise fastened to rear side 41 of main portion 40 of enclosure 20 through holes 62.

Frame 22 further includes an upper module mounting bracket 66, and a lower module mounting bracket 68 extending between sides 58. Each module mounting bracket 66, 68 receives a plurality of modules 23 connected via fasteners 70, such as screws, or other fasteners. Preferably, the fasteners are releasable to enable removal of modules 23, as desired, such as for repair, or replacement. Each of the module mounting brackets 66, 68 includes a plurality of holes 67, 69 for receipt of fasteners 70.

Lower module mounting bracket 68 defines a cable tray 60 (FIG. 5) including a plurality of lower holes 72, each sized for receipt of one or more cables, as will be described in greater detail below.

A cover 76 (FIGS. 5 and 6) mounts to frame 22 so as to close front 74. Side flanges 78 to cover 76 include a plurality of downwardly angled slots 80 for receipt of pins 82 extending from sides 58, 60 of frame 22. Nuts, such as wing nuts, can be mounted to pins 82 with threads to help secure cover 76 to frame 22.

Referring now to FIGS. 1–4, and 8–12, a connection module 24 is shown. Connection module 24 comprises one of modules 23. Connection module 24 includes a front 90 defining a plurality of connection locations 91. Front 90 also includes opposed mounting flanges 92, 94 extending along front 90 for mounting to module mounting brackets 66, 68 of frame 22. Each of flanges 92, 94 includes a plurality of holes 96, 98 for receiving fasteners 70. A spaced apart rear 100 of connection module 24, and a spaced apart top 102 and bottom 104, and opposed, spaced apart sides 106, 108 define an interior region. A cable notch 110 formed by portion of rear 100, bottom 104, and sides 106, 108 receives a cable 300 for connection to the connection locations 91 within the interior of module 24. Notch 110 further includes an opening 112 for cable 300. Opening 112 is large enough to receive one or more additional cables.

Each of the connection locations, 91 preferably includes an adapter 200 for mounting to a fiber optic connector, such as an SC (shown), an ST, an FC, or other connector. Cable 300 entering connector module 24 at opening 112 includes its individual fibers connected to the individual connection locations 91, as desired. Two illustrated example fibers 300a, 300b of cable 300 connect to two connection locations 91. A connector 208 (FIG. 11) is preferably on an end of fibers 300a, 300b. Adapter 200 preferably has two ends 202 and 204. End 202 is disposed within module 24 for connection to connector 208. Opposite end 204 defines the exposed opening of the connection location 91 along the front of module 24 for connection to a second connector 218. A clip 210, such as the clip disclosed in U.S. Pat. No. 5,214,735 may be used to releasably attach each adapter to module 24. Clip 210 also angles connection locations 91 downwardly when module 24 is installed in frame 22 as in the drawings. Each clip 210 holds each adapter 200 in one of the openings 93 of front 90 of module 24 to define each connection location in the preferred embodiment. In the illustrated embodiment of module 24, only two connection locations 91 are shown, but a fully loaded module 24 would define a connection location 91 at each opening 93. Clip 210 is preferably a snap mounted clip to enable easy assembly. A removable clip 210 is preferred to allow cleaning of connector 208 and end 202 if desired.

A similarly configured second connection module 24a is mounted to frame 22 to permit cross-connection through the use of patch cords 114a, 114b (FIG. 3) to cross-connect between the fibers of each cable connected to the respective connection modules 24, 24a. Cable 302 is connected to the rear of module 24a as cable 300 is for module 24. Patch cords 114a, 114b, and fibers 300a, 300b are shown schematically in FIGS. 3 and 9, but each fiber has a connector like connectors 208, 218 to mate with adapter 200. Alternatively, other connector systems as noted above can be used, as desired.

Each connection module 24, 24a can be made of sheet metal sections, held together with fasteners, such as screws, so as to allow access as desired to the interior of each module.

Figure 20:
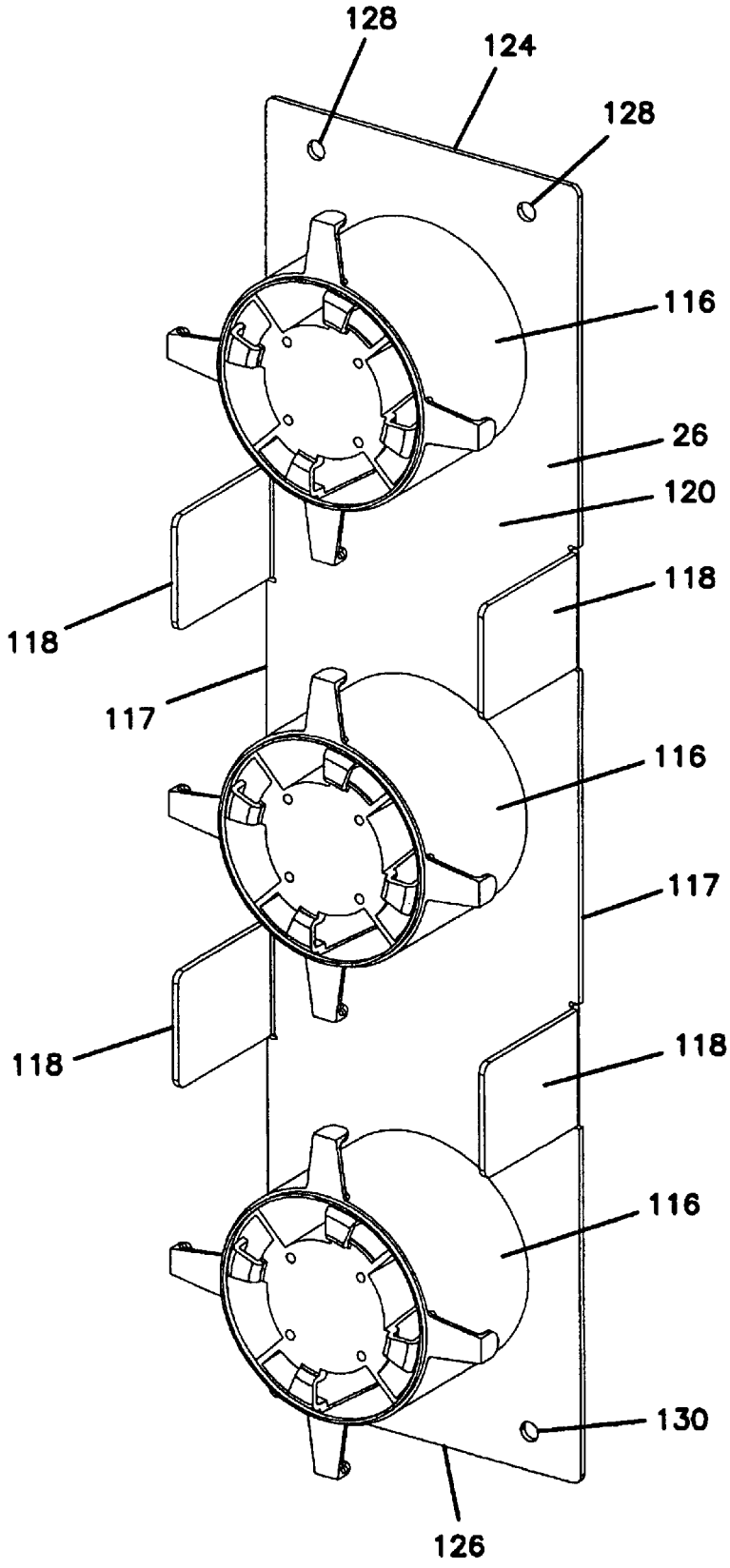
FIG. 20 is a perspective view of a cross-connect storage module.
Figure 21:
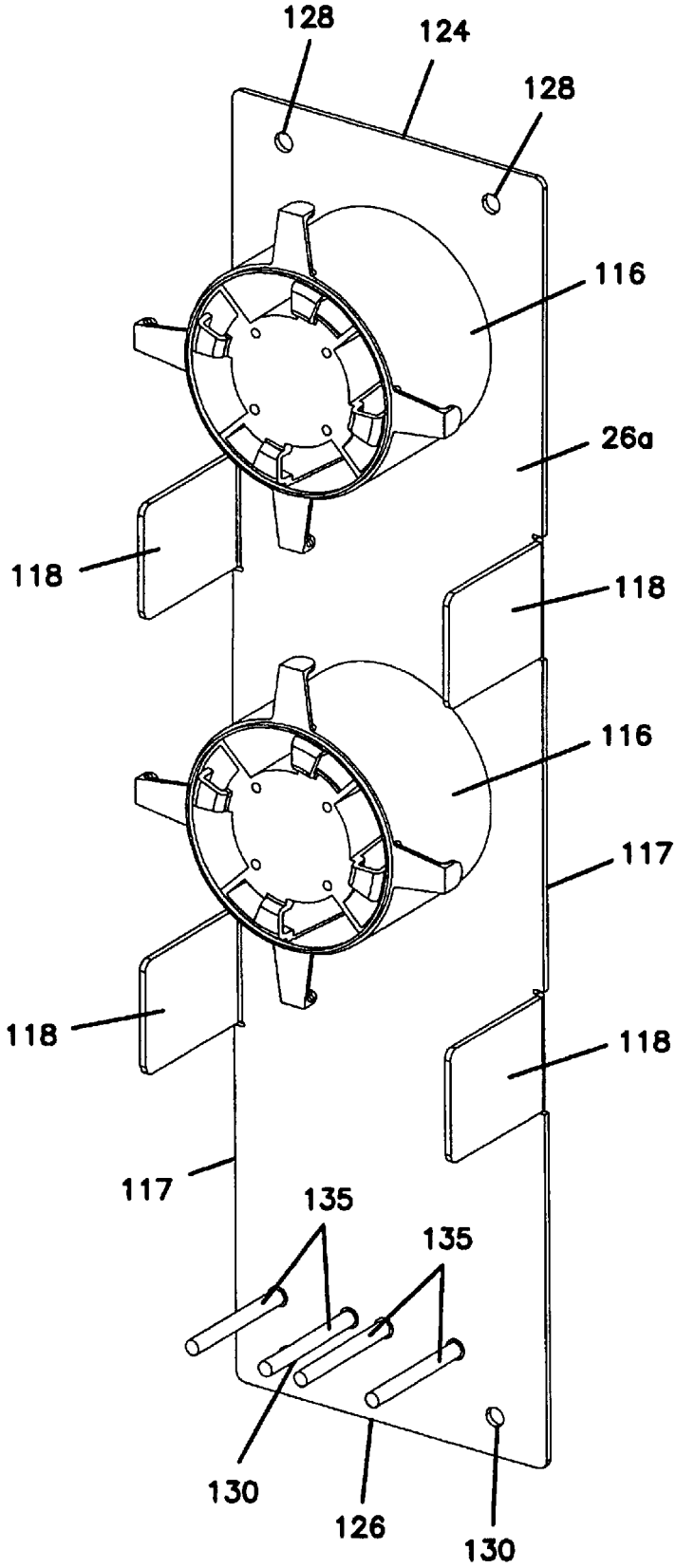
FIG. 21 is a perspective view of an interconnect storage module.

To facilitate cable management, and cable protection, a cross-connect storage module 26 as one of modules 23 is provided having three spools 116 along a front 120 (FIGS. 1, 3 and 20). Along a front 120 of an interconnect storage module 26a as one of modules 23 is provided two spools 116 (FIGS. 2, 4 and 21). Flanges 124, 126 permit mounting of each storage module 26, 26a to frame 22 in a similar manner as modules 24, 24a. Holes 128, 130 receive fasteners 70 to mount storage modules 26, 26a to frame 22. Front projections 118 along vertical side edges 117 further enable cable management and cable protection during use. A cable clamp 134 (FIG. 4) is provided for front mounting of one or more cables to storage module 26a for the interconnect system. Posts 135 (FIG. 21) hold the clamp pieces.

Cable notch 110 is useful to avoid excess cable bending during manipulation and positioning of connection modules 24. The use of notch 110 provides a greater distance between the cables extending upward from the ground to the clamp mounting locations on modules 24. The extra distance is advantageous when manipulating module 24 as it is installed into or removed from frame 22.

In the example cross-connect system of FIG. 3, two fibers 300a, 300b (FIG. 9) of cable 300 are shown as optically linked to two fibers of cable 302 through patch cords 114a, 114b in a cross-connect application between modules 24, 24a. In the example interconnect system of FIG. 4, two fibers 402a, 402b of cable 400 are shown as optically linked to two fibers of cable 400.

Figure 18:
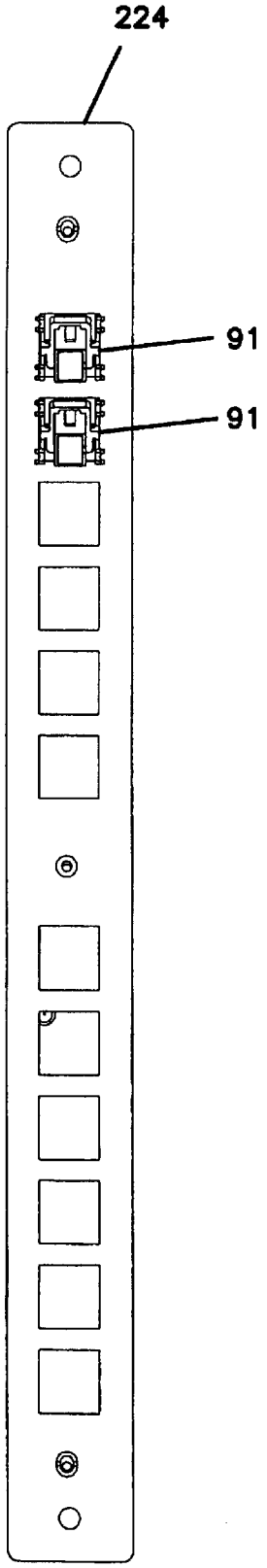
FIG. 18 shows an alternative connection module to the module of FIG. 8 with one vertical row of adapters.
Figure 19:
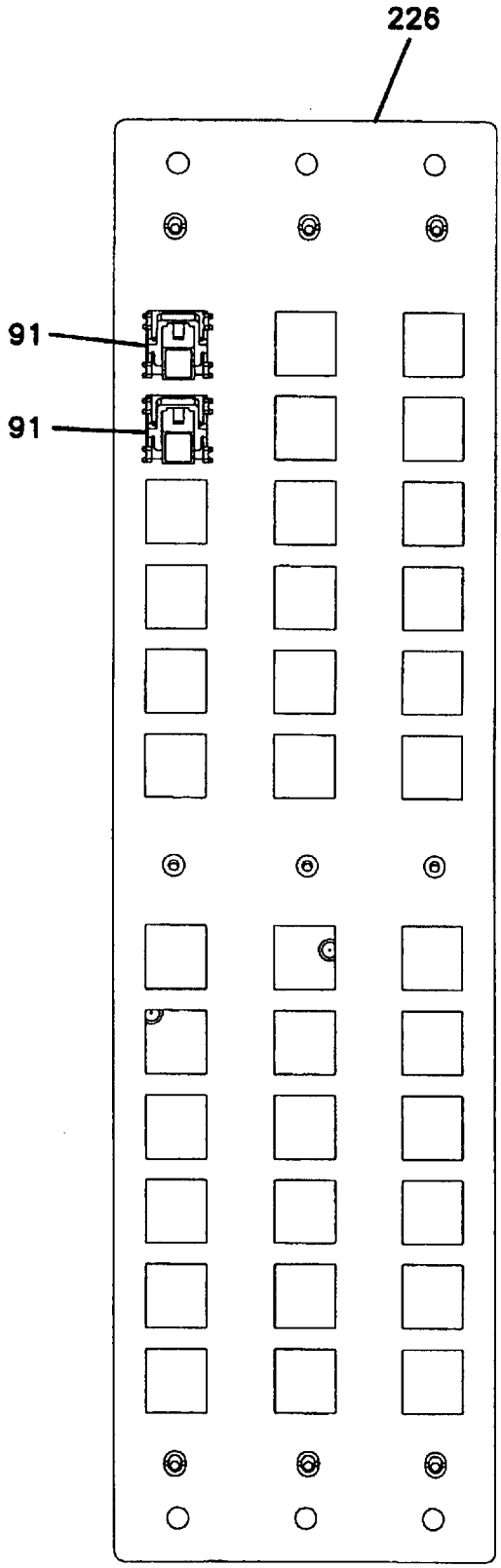
FIG. 19 shows a second alternative connection module with three vertical rows of adapters.

Referring now to FIGS. 18 and 19, alternative connection modules 224, 226 include different numbers of vertical rows of connector locations 91. Modules 24, 24a included two vertical rows. Connection module 224 includes a single row of connection locations 91, and connection module 226 includes three. Four or more rows are also possible.

Figure 13:
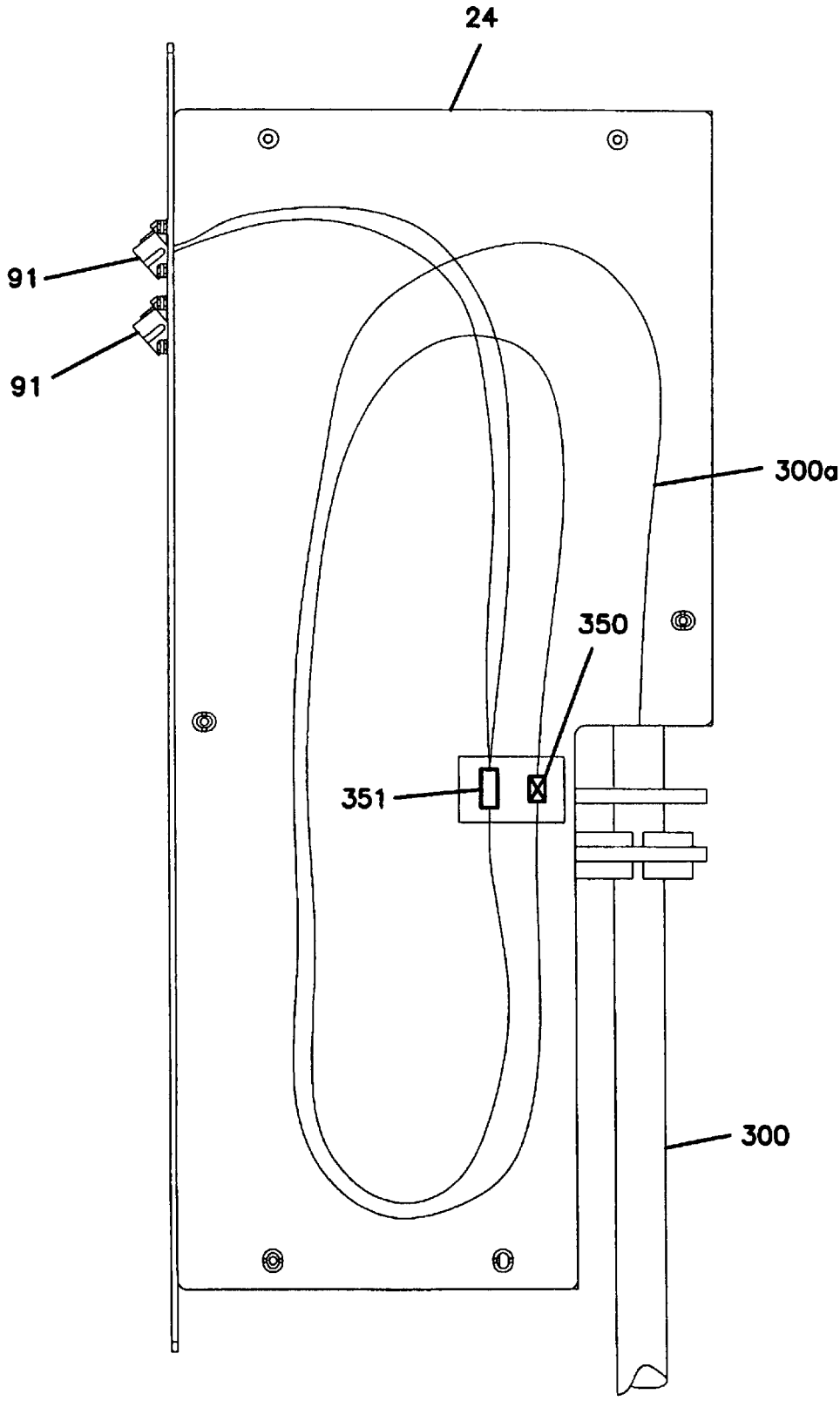
FIG. 13 is a side view of a connection module like that shown in FIG. 9, and showing an exemplary fiber from the first cable linked to a splice, an optical splitter, and two front adapters, one from each vertical row.
Figure 14:
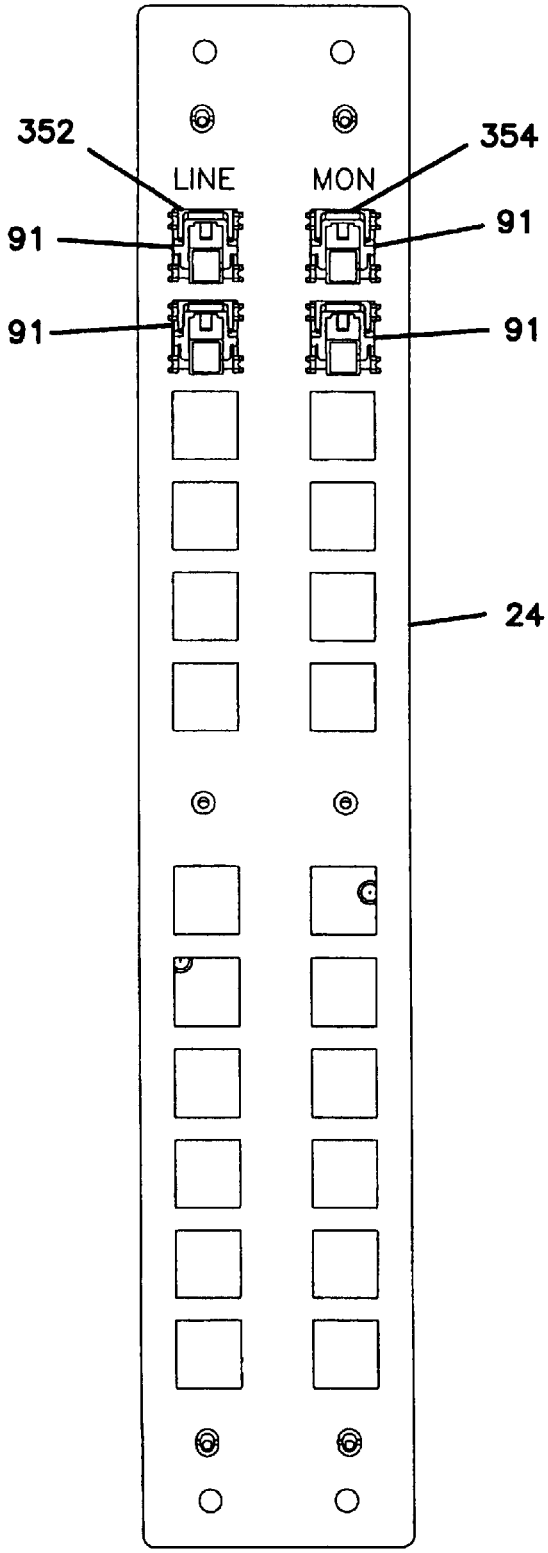
FIG. 14 is a front view of the connection module of FIG. 13.

Referring now to FIGS. 13–17, module 24 is shown as including optical components such as splices and/or optical couplers within the module between cable 300, and connection locations 91. In FIGS. 13 and 14, a splice 350 to a one-by-two optical splitter 351 allows for module 24 to have line and monitor functions associated with connection locations 91. Row 352 of connection locations 91 could serve as the line function, and row 354 could serve as the monitor function. Each pair of connection locations 91 (one from each row) would be linked to one of the fibers of cable 300 in FIG. 13. Other splitters, such as one-by-fours, etc. may be used, as desired.

Figure 15:
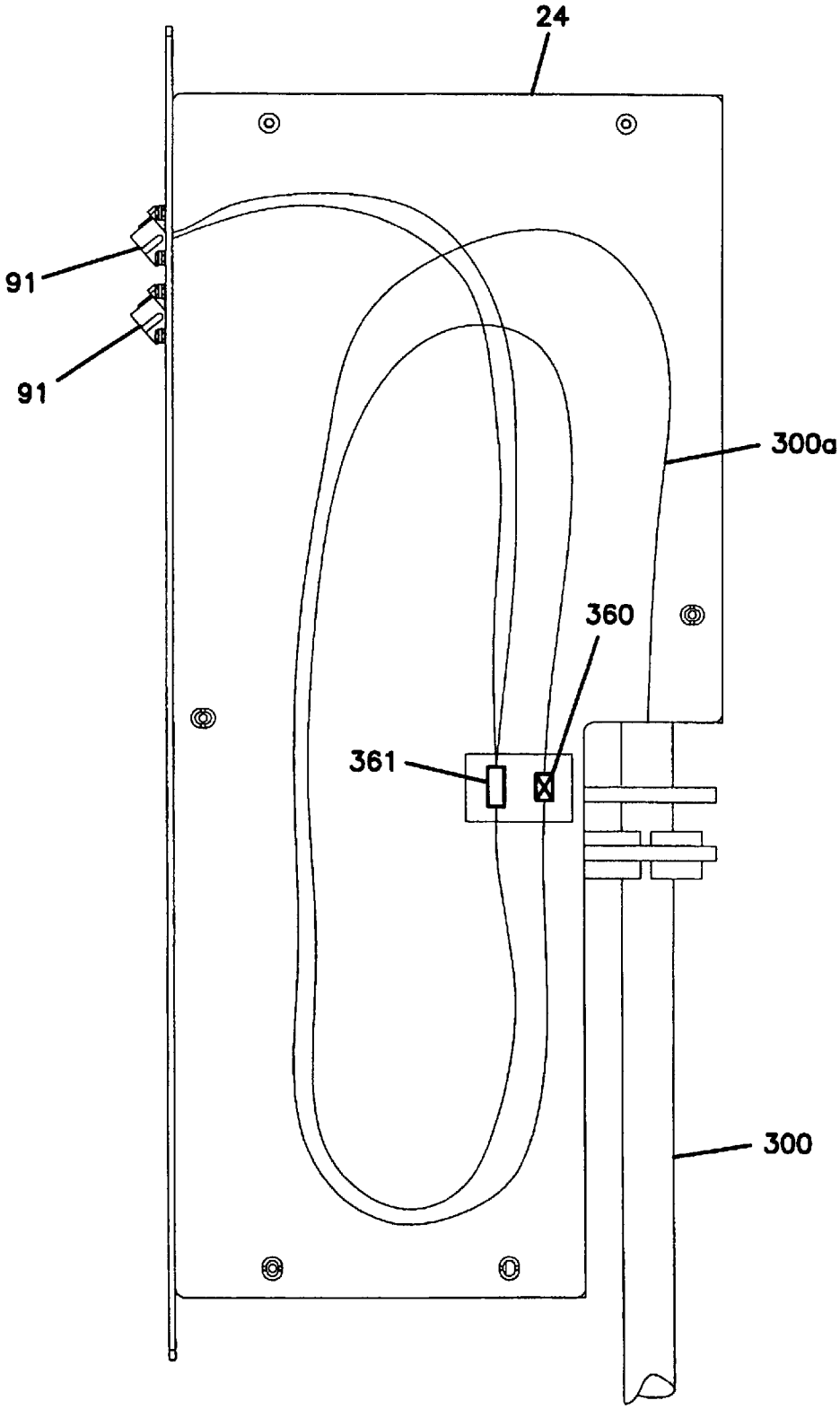
FIG. 15 is a side view of a connection module like that shown in FIG. 9, and showing an exemplary fiber from the first cable linked to a splice, a WDM, and two front adapters, one from each vertical row.
Figure 16:
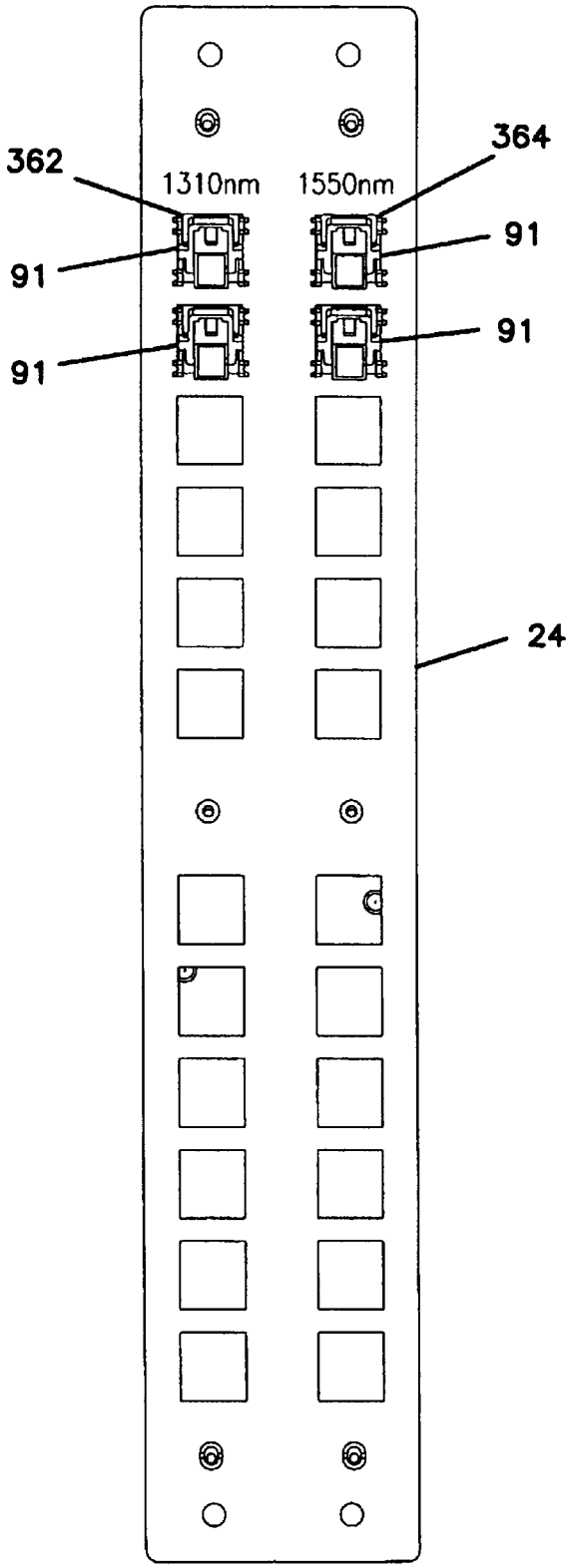
FIG. 16 is a front view of the connection module of FIG. 15.

In FIGS. 15 and 16, a splice 360 to a wave division multiplexer (WDM) 361 allows for module 24 to have wavelength division multiplexing functions associated with connection locations 91. A "dense" wave division multiplexer may be used, if desired (DWDM). For the multiplexing function, row 362 of connection locations 91 could serve as the first wavelength ports, and row 364 could serve as the different wavelength ports. Each pair of connection locations 91 (one from each row) would be linked to one of the fibers of cable 300 in FIG. 15.

Figure 17:
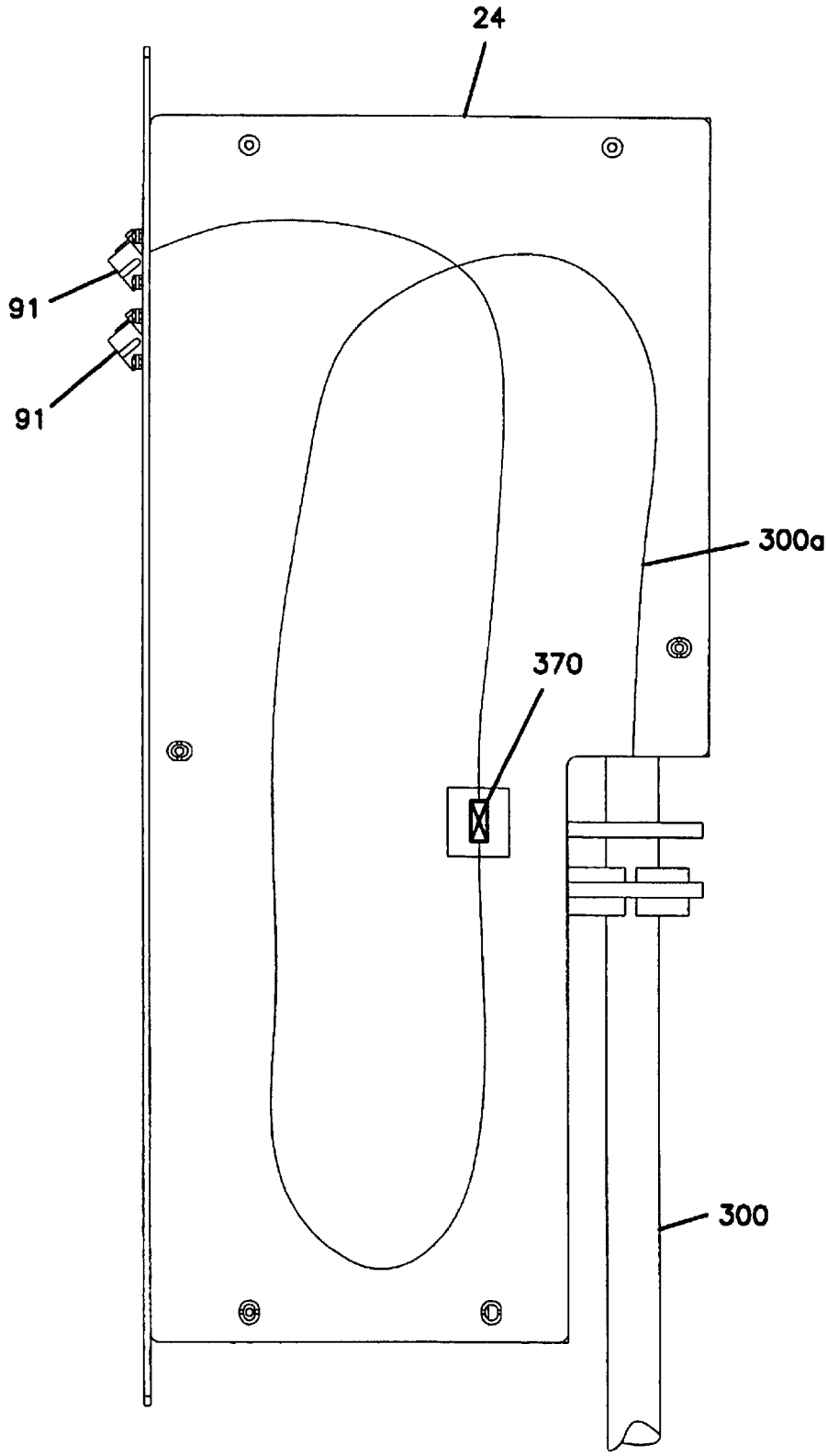
FIG. 17 is a side view of a connection module like that shown in FIG. 9, and showing an exemplary fiber from the first cable linked to a splice, and a front adapter.

FIG. 17 shows just a splicing component 370 so that each fiber of cable 300 could be spliced to a fiber leading to one connection location 91. Other passive optical components can be selected as desired to provide module 24 with the desired function or functions.

Figure 22:
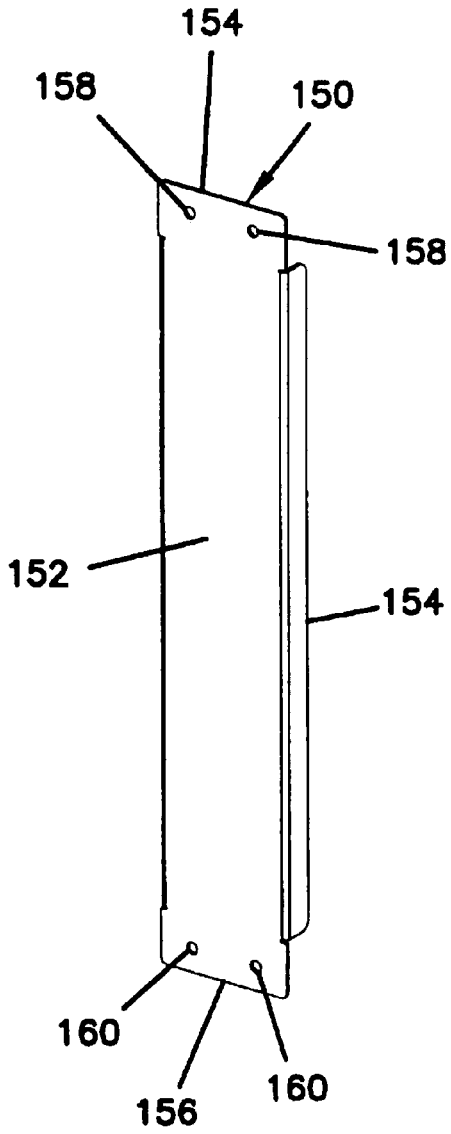
FIG. 22 is a perspective view of a two-position blank module.
Figure 23:
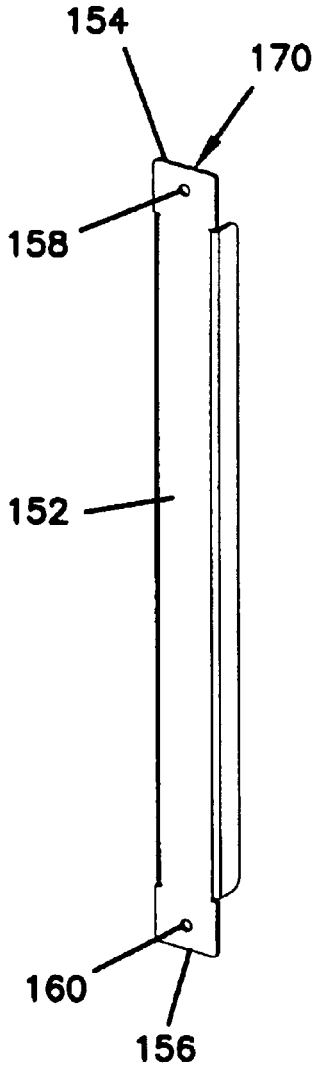
FIG. 23 is a one-position blank module.

Referring now to FIGS. 22 and 23, blank panels 150, 170 comprising modules 23 are shown. Each blank panel 150, 170 includes a generally planar front 152, and flanges 154 including holes 158, 160 to enable mounting of the blank modules 150, 170 to frame 22. Blank modules 150, 170 are utilized to fill open spaces of frame 22. Blank module 170 is a single width, and blank module 150 is a double width. Additional widths can be supplied as desired.

During assembly of a system for a particular outside plant application, the desired function (cross-connect, interconnect, other) is selected. The types of modules 23 (connection, storage, blank) and widths of modules 23 are also selected. Further the types of connections and whether any optical splices or optical couplers are to be utilized are selected. The appropriate modules are selected and then mounted to frame 22 within an enclosure 20. Over time, the modules 23 can be removed for repair, replacement, or to change function. Also, the front connections can be changed as the need arises.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A connection module comprising:

a housing including a front and two mounting flanges, a rear of the housing spaced from the front, a top spaced apart from a bottom, the top and the bottom positioned adjacent to the mounting flanges, and opposed spaced apart sides;

a plurality of connection locations having exposed openings along the front;

the bottom, the rear, and the opposed sides defining a cable notch region wherein the cable notch region defines an opening for receiving a first cable; and a cable clamp *mounted on and* extending from the rear in the cable notch region*;*

*wherein the connection locations include a plurality of adapters configured and arranged for connection to an optical fiber connector, the adapters positioned at an angle having a component angle in the direction of the bottom of the housing.*

[2. The connection module of claim 1, wherein the connection locations include a plurality of adapters configured and arranged for connection to an optical fiber connector, the adapters positioned at an angle having a component angle in the direction of the bottom of the housing.]

3. The connection module of claim [2] *1*, further comprising clips which are snap fit to the front of the housing, the clips each holding at least one adapter.

4. The connection module of claim 1, [wherein the connection locations include a plurality of adapters, and] further comprising a first cable connected to the housing by the clamp, and interior cables optically connected to the adapters, the interior cables optically connected to a splice, the splice optically connected to the first cable.

5. The connection module of claim 1, [wherein the connection locations include a plurality of adapters, and] further comprising a first cable connected to the housing by the clamp, and interior cables optically connected to the adapters, the interior cables optically connected to a optical coupler, the optical coupler optically connected to the first cable.

6. The connection module of claim 5, wherein the optical coupler includes a splitter.

7. The connection module of claim 5, wherein the optical coupler includes a wavelength division multiplexer.

8. The connection module of claim 6, further comprising a splice between the first cable and the splitter.

9. The connection module of claim 7, further comprising a splice between the first cable and the wavelength division multiplexer.

*10. The connection module of claim 1, wherein the opening defined in the cable notch region is a downwardly facing opening.*

*11. A connection module comprising:*

*a housing having an interior defined by a front portion and a rear portion spaced apart from the front portion, the front portion being substantially parallel to the rear portion, the housing including mounting structure to removably mount the housing to a frame;*

*a plurality of connection locations having exposed openings disposed in the front portion, the connection locations being arranged in an array of vertical rows when the housing is mounted to the frame, the connection locations including a plurality of adapters configured and arranged for connection to an optical fiber connector; and*

*a splicing component disposed at least partially between the connection locations and the rear portion, the splicing component configured to optically connect a fiber optic cable that is connected to the module to interior cables that are optically connected between the splicing component and the connection locations;*

*the housing further including a lower portion having a direct opening into the interior of the housing, the opening sized to receive a fiber optic cable;*

*wherein the adapters are positioned at an angle having a first angle component angle that is in the direction of the rear portion to the front portion and a second component angle that is in the direction of the lower portion.*

*12. The connection module of claim 11, wherein the mounting structure includes a surface having mounting locations, the mounting locations adapted to removably mount the housing to a frame.*

*13. The connection module of claim 11, wherein the splicing component comprises a splice.*

*14. The connection module of claim 11, wherein the connection locations include a plurality of adapters, and further comprising at least one interior cable that is optically connected between the splicing component and at least one of the adapters, and further comprising a first cable that is physically connected to the housing and is optically connected to the splicing component.*

*15. The connection module of claim 11, wherein the splicing component includes at least one splice that is disposed entirely between the housing front and rear portions.*

*16. The connection module of claim 11, further comprising a cable attachment member coupled to the housing, the cable attachment member adapted to attach a fiber optic cable to the housing.*

*17. The connection module of claim 11, wherein the opening into the interior of the housing is a downwardly facing opening.*

*18. The connection module of claim 17, wherein the opening into the interior of the housing is a fully circumscribed opening.*

*19. The connection module of claim 11, wherein the opening is sized to receive at least two fiber optic cables.*

*20. A connection module comprising:*

*a housing having a front portion and a rear portion spaced apart from the front portion, the front portion being substantially parallel to the rear portion, the housing further having a lower portion defining an opening, the opening sized to receive a fiber optic cable, the housing including mounting structure to removably mount the housing to a frame;*

*a plurality of connection locations having exposed openings disposed in the front portion, the connection locations being arranged in an array of vertical rows when the housing is mounted to the frame, the connection locations including a plurality of adapters config-*

*ured and arranged for connection to an optical fiber connector, the adapters positioned at an angle having a first component angle that is in the direction of the rear portion to the front portion and a second component angle that is in the direction of the lower portion; and*

*a splicing component disposed at least partially between the connection locations and the rear portion, the splicing component configured to optically connect a fiber optic cable that is connected to the module to interior cables that are optically connected between the splicing component and the connection locations.*

*21. The connection module of claim 20, wherein the opening is sized to receive at least two fiber optic cables.*

*22. A connection module comprising:*

*a housing including a front and two mounting flanges, a rear of the housing spaced from the front, a top spaced apart from a bottom, the top and the bottom positioned adjacent to the mounting flanges, and opposed spaced apart sides; a plurality of connection locations having exposed openings along the front; the bottom, the rear, and the opposed sides defining a cable notch region wherein the cable notch region defines an opening for receiving a first cable; and a cable clamp extending from the rear in the cable notch region;*

*wherein the connection locations include a plurality of adapters configured and arranged for connection to an optical fiber connector, the adapters positioned at an angle having a component angle in the direction of the bottom of the housing.*

*23. The connection module of claim 22, further comprising clips which are snap fit to the front of the housing, the clips each holding at least one adapter.*

*24. A connection module, comprising:*

*a) a housing having a front, a rear, a top and a bottom, the housing including a top mounting flange projecting upward relative to the top of the housing, the top mounting flange including a fastener hole extending through the top mounting flange in a frontward-rearward direction relative to the housing, the housing defining an interior;*

*b) a telecommunications cable that enters the housing at the bottom, the telecommunications cable including a plurality of optical fibers, the optical fibers having ends located within the interior of the housing;*

*c) optical connectors positioned at the ends of the optical fibers; and*

*d) a plurality of adapters, the adapters being arranged in side-by-side adapter pairs, each of the adapters including:*

*i) a first end located within the interior of the housing, the first end being configured to connect to the optical connector at the end of one of the optical fibers; and*

*ii) a second end accessible from outside the housing, the second end being angled downward from the front of the housing.*

*25. The connection module of claim 24, wherein the telecommunications cable is attached to the housing by a cable clamp.*

*26. The connection module of claim 25, wherein the cable clamp is located outside of the housing.*

*27. The connection module of claim 25, wherein the cable clamp is located within a notched region formed in the bottom and the rear of the housing.*

*28. The connection module of claim 24, wherein the adapters are SC type adapters.*

*29. A connection module, comprising:*

*a) a housing having a front, a rear, a top and a bottom, the housing including a top mounting flange projecting upward relative to the top of the housing, the top mounting flange including a fastener hole extending through the top mounting flange in a frontward-rearward direction relative to the housing, the housing defining an interior;*

*b) a telecommunications cable that enters the housing through a cable opening located at the bottom of the housing, the telecommunications cable including a plurality of optical fibers, the optical fibers having ends located within the interior of the housing;*

*c) optical connectors provided at the ends of the optical fibers;*

*d) the front of the housing defining a plurality of front openings, the front openings being arranged in side-by-side opening pairs; and*

*e) a plurality of adapters providing connection locations at the front of the housing, the adapters being mounted within the front openings defined at the front of the housing, the adapters including:*

*i) first ends located within the interior of the housing for receiving the optical connectors provided at the ends of the optical fibers; and*

*ii) second ends accessible from outside the housing for receiving optical connectors located outside of the housing;*

*f) wherein the adapters are angled such that the second ends of the adapters face downwardly.*

*30. The connection module of claim 29, wherein the connection module includes at least two vertical rows of adapters at the front of the housing.*

*31. The connection module of claim 29, wherein the connection module includes only two vertical rows of adapters at the front of the housing.*

*32. The connection module of claim 29, wherein the telecommunications cable is clamped to the housing.*

*33. The connection module of claim 29, wherein the housing includes a first mounting flange located at the top of the housing and a second mounting flange located at the bottom of the housing.*

*34. The connection module of claim 33, wherein the first mounting flange defines at least one fastener opening and the second mounting flange defines at least one fastener opening.*

*35. The connection module of claim 29, wherein the adapters are SC type adapters.*

*36. A connection module, comprising:*

*a) a housing having a front, a rear, a top and a bottom;*

*b) a telecommunications cable that enters the housing through a cable opening located at the bottom of the housing, the telecommunications cable including a plurality of optical fibers, the optical fibers having ends located within an interior of the housing;*

*c) optical connectors provided at the ends of the optical fibers;*

*d) the front of the housing defining a plurality of front openings; and*

*e) a plurality of adapters providing connection locations at the front of the housing, the adapters being mounted within the front openings defined at the front of the housing, the adapters including:*

*i) first ends accessible from within the interior of the housing for receiving the optical connectors provided at the ends of the optical fibers; and*

*ii) second ends accessible from outside the housing for receiving optical connectors located outside of the housing;*

*f) wherein the adapters are angled such that the second ends of the adapters face downwardly, and*

*g) wherein the housing is configured such that when the housing is mounted to another structure, the front of the housing faces outwardly from the structure.*

*37. The connection module of claim 36, wherein the housing includes a fastener hole extending in a generally frontward-rearward direction relative to the housing, the fastener hole being configured to receive a fastener to mount the housing to another structure.*

*38. The connection of module of claim 37, wherein the fastener hole extends through a mounting flange.*

*39. A telecommunications connection device, comprising:*

*a) a housing having a front and a rear, the housing defining an interior and a cable opening;*

*b) a telecommunications cable that enters the housing through the cable opening, the telecommunications cable including a plurality of optical fibers, the optical fibers having ends located within the interior of the housing, the telecommunications cable extending outwardly from the housing in a first direction;*

*c) optical connectors provided at the ends of the optical fibers;*

*d) the front of the housing defining a plurality of front openings; and*

*e) a plurality of adapters providing connection locations at the front of the housing, the adapters being mounted within the front openings defined at the front of the housing, the adapters including:*

*i) first ends accessible from within the interior of the housing for receiving the optical connectors provided at the ends of the optical fibers; and*

*ii) second ends accessible from outside the housing for receiving optical connectors located outside of the housing;*

*iii) the adapters being angled such that the second ends of the adapters face generally in the first direction;*

*f) the telecommunications connection device being an outside plant device.*

* * * * *

UNITED STATES PATENT AND TRADEMARK OFFICE

CERTIFICATE OF CORRECTION

PATENT NO. : RE40,358 E
APPLICATION NO. : 10/810547
DATED : June 3, 2008
INVENTOR(S) : Thompson et al.

It is certified that error appears in the above-identified patent and that said Letters Patent is hereby corrected as shown below:

Col. 3, line 31: "configuration, With portions" should read --configuration, with portions--

Col. 4, line 63: "flanges 78 to cover 76" should read --flanges 78 of cover 76--

Col. 7, line 3: "change function. Also," should read --change functions. Also,--

Signed and Sealed this
Thirtieth Day of August, 2011

David J. Kappos

David J. Kappos
*Director of the United States Patent and Trademark Office*